June 12, 1962 W. H. WEBB ETAL 3,038,844
SEPARATIONS BY ELECTRODIALYSIS
Filed Jan. 24, 1961
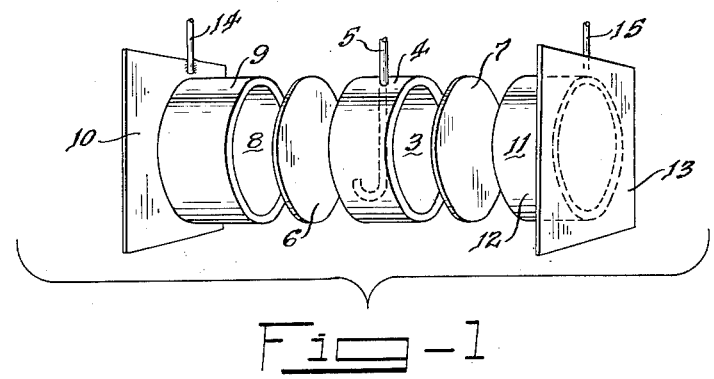
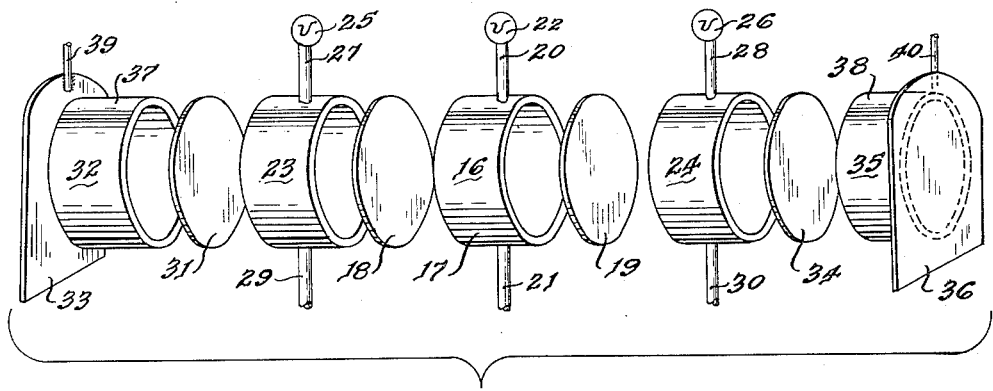
INVENTORS
William H. Webb
Jerry D. Vie
BY
Roland G. Anderson
Attorney United States Patent Office 3,038,844
Patented June 12, 1962

3,038,844
SEPARATIONS BY ELECTRODIALYSIS
William H. Webb, Rolla, and Jerry D. Vie, St. Charles, Mo., assignors to the United States of America as represented by the United States Atomic Energy Commission
Filed Jan. 24, 1961, Ser. No. 84,741
5 Claims. (Cl. 204—180)

The invention relates to novel separations by electrodialysis, more particularly to such separations of the ionic and other species in the aqueous solutions resulting from dissolving irradiated fuels from nuclear reactors in aqueous solvents, such as nitric acid.

It is now common practice to "reprocess" the irradiated, or "spent" fuels from nuclear reactors in order to recover the unused fissionable fuel values, but due to the difficulty and expense of separating the various fission products created by the nuclear reaction, this separating is not always done, and a number of such products with potential economic value are thereby consigned to waste.

Among the fission products for which uses have been found are cesium-137, cerium-144, and zirconium-95 for which, up until the present time, no means of separation has been found to make these isotopes sufficiently cheap to be used in all the applications for which they are inherently suited. These are all sources of strong beta radiations as well as gamma radiations, and could be used for thickness testing, leak testing, and as tracers in chemical and metallurgical studies.

Apart from their economic value, it is sometimes desirable to remove from solutions the cesium, cerium, and zirconium values in order to avoid interference effects with a process designed to recover other components. For example, in the recovery of uranium values in aqueous solutions by ion exchange, cesium, cerium, and zirconium values have such strong affinities for certain ion exchange resins that they usurp functional groups on the resins intended for the uranium. If an economical means could be discovered for removing these interfering values in advance, the ion exchange recovery of uranium would be rendered more efficient, and the product less contaminated.

Even after the separation of the uranium from the fission products by any one of the various methods now in use, trace amounts of uranium values remain in the "waste solutions," which is the somewhat misleading name given to fuel reprocessing solutions after the actinide values have been taken out, even though, as above explained, the fission products remaining have considerable economic importance. If the fission products are to be separated from such solutions, the trace uranium values must be separated. This is especially difficult when the recovery of cerium is sought, due to the great chemical similarity between the actinide and the lanthanide elements.

It is, accordingly, an object of the invention to provide a method whereby cesium, cerium, zirconium, and uranium values may be separated from a solution.

It is a more particular object to provide a method whereby cesium, cerium, and zirconium values may be removed from a solution of dissolved nuclear fuel elements prior to the extraction of uranium values from the solution.

It is a further object to provide a method of separating trace amounts of uranium values persisting in a waste solution, from the cerium, cesium, and zirconium values therein.

It is a more particular object to provide a method for separating cerium values from uranium values in a solution.

All the foregoing objects are attained by our discovery that cesium, cerium, zirconium, and uranium values can be separated from each other in solution, individually or in combinations, by altering the acidity of the solution and then subjecting them to electrodialysis through certain ion exchange membranes under certain conditions which will be explained.

FIGURE 1 is a schematic exploded view of one type of apparatus used in the carrying out of the method of our invention.

FIGURE 2 is a schematic exploded view of another type of apparatus used in carrying out the method of our invention.

Referring now to FIGURE 1, a feed compartment designated generally at 3, receives batches of the solution whose components are to be separated. Feed compartment 3 consists of a cylindrical portion 4 of any suitable dielectric material such as plastics of the polyacrylic type, which are preferred because of their high resistance to liquids and transparency to permit the dialysis to be viewed while in progress. A rotating stirrer 5 is located within feed compartment 3 for the purpose of maintaining uniformity of the solution as the dialysis proceeds.

Cylindrical portion 4, as illustrated, if of circular cross-section, but, of course, a square, oblong, or other cross-section would serve about equally well. The lateral walls of compartment 3 are formed by membranes 6 and 7 which are tight against cylindrical portion 4 when the apparatus is assembled, but are shown apart for purposes of clarity in the exploded view.

Membranes 6 and 7 are of opposite types; membrane 6 is of the cation exchange type; that is to say, the molecules of the resin constituting the membrane having anionic functional groups, such as sulfonic or carboxylic groups, whereby cations are held by the resin and exchanged for other cations. Membrane 7 is of the anion exchange type due to its molecules having cationic functional groups such as amine or imine groups on which anions are held and exchanged.

A cathode compartment, designated generally at 8, consists of a cylindrical portion 9 of the same material and of equal diameter to that of cylindrical portion 4, and of lateral side walls consisting of cation exchange membrane 6 and a cathode, or negative electrode 10, which is a flat plate of metal such as platinum or any other metal with suitable electrical and corrosion resistant properties. Of course, the leftmost lateral wall may be made of dielectric material and the electrode placed inside the cathode compartment 8, but the construction shown is preferred because of its simplicity and efficiency of operation. Similarly the anode compartment, designated generally as 11, consists of cylindrical portion 12, and for lateral walls has membrane 7 and the anode, or positive electrode 13.

Wires 14 and 15 apply an electric potential to cathode 10 and anode 13, respectively, whereby current is carried from anode 13 to cathode 10, respectively, in the sense of conventional electrical signs, or a stream of electrons to cathode 10 from anode 13. Both cathode compartment 8 and anode compartment 11 are filled with conductive solutions (not shown) such as dilute nitric acid; an aqueous acid solution is preferred having the same anion as the predominant anion in the solution to be separated. In the case of solutions of dissolved nuclear reactor fuels the predominant anion is in most cases the nitrate ion, and in this situation 0.5 N nitric acid is preferred for the cathode and anode compartments 8 and 11.

The apparatus of FIGURE 2 is essentially the same as that of FIGURE 1, except that it is designed for a continuous flow of the solutions and the anode and cathode compartments are subdivided into two parts whereby the electrodes are left out of direct contact with the strong solutions of ions, thus eliminating the oxidation and reduction of the ionic species at the electrodes and, incidentally, making it possible to use cheaper metals for the electrodes.

In FIGURE 2, a feed compartment, designated generally as 16, consists of a cylindrical portion 17 and for side walls has cation exchange membrane 18 and anion exchange membrane 19 which, as was explained for the apparatus of FIGURE 1, are tight against cylindrical portion 17 when the apparatus is assembled. Instead of a stirrer, feed compartment 16 has a feed intake 20 and a dialyzate outlet 21, whereby the solution being processed may be fed from a feed tank (not shown) into feed compartment 16 on a continuous basis and permitted to flow out of outlet 21 into a receiving tank (not shown), the flow being regulated by valve 22.

Similarly cathode subcompartment 23 and anode subcompartment 24 have valves 25 and 26 respectively to regulate the flow of conductive wash solutions from wash storage tanks (not shown) into them respectively through conductive solution inlets 27 and 28. Conductive wash solution outlets 29 and 30 lead from inner subcompartments 23 and 24 respectively into separate wash receiving tanks (not shown). The conductive wash solutions are preferably aqueous solutions of acids having the same anions as the predominant anion in the feed solution.

Inner cathode subcompartment 23 has as its lateral walls cation exchange membrane 18 and anion exchange membrane 31. It will be noted that these two membranes are of opposite type, and therefore together will effectively prevent any substantial amounts of ions from entering the outer cathode subcompartment, designated generally at 32, without interfering with the electrostatic attraction of the cathode 33 for the cations that pass freely through cation exchange membrane 18. Thus effective electrodialysis, without electrolysis, is achieved.

Similarly cation exchange membrane 34, together with anion exchange membrane 19, will prevent any substantial amounts of ions from entering into the outer anode subcompartment, designated generally at 35, without interfering with the electrostatic attraction of anode 36 for the anions that pass freely through anion exchange membrane 19. Outer subcompartments 32 and 35 have respective cylindrical portions 37 and 38; outer cathode subcompartment 32 has a flat metal cathode 33 electrically connected to wire 39, and outer anode subcompartment 35 has a flat metal anode 36, electrically connected to wire 40. Both outer subcompartments 32 and 35 are filled with conductive solutions similar to those in compartments 8 and 11 in the apparatus of FIGURE 1.

While the method of our invention could be used to separate any of the isotopes of cesium, cerium, zirconium, and uranium regardless of concentration, its greatest practical use doubtless lies in the separation of the radioactive isotopes of these elements in the extremely small concentrations in which they are found in nuclear waste solutions. In such concentrations the methods of classical chemistry are not sufficiently precise and it is therefore customary to employ "counting methods," in which concentration is found by counting nuclear events, and concentrations are expressed as "decomposition per minute" (dpm) or "decomposition per second" (dps) per unit volume, such as a liter or milliliter.

Table I is now offered showing conditions pertaining and results obtained from the electrodialysis of the isotopes listed in the left hand column in the apparatus of FIGURE 2. As indicated, the first six runs were made with the isotopes present in neutral solutions, and the bottom four runs were made with the isotopes present in solutions 0.5 N in HF. The runs were separate, the isotope in question not being commingled with any other radioatcive components, but all the feed solutions were about 1 N in sodium nitrate. The presence of a neutral salt of this kind aids the electrodialysis by increasing the conductivity of the solution, but it does not substantially affect the outcome in any other way. All operations were carried out at room temperature for a period of two hours. The cation exchange membranes were of the polyacrylic type having sulfonic functional groups sold under the trade name Nalco. The anion exchange membranes were of the polystyrene type having quaternary ammonium functional groups sold under the trade name Permutit Permeable. The conductive wash solutions were 1 N $HNO_3$ in both the cathode and anode inner subcompartments; the conductive solutions in both outer subcompartments were 1 N $HNO_3$.

TABLE I

| Neutral Solution | | Feed Flow Rate, Ml./Min. | Current Density, Milliamp./sq. in. | Relative Proportion in Receiving Tanks of each Compartment after 2 Hrs., percent | | | Percent Activity Recovered |
|---|---|---|---|---|---|---|---|
| Substance | Concn. of Feed, dps/ml. | | | Cathode | Feed | Anode | |
| Cs-137 | 86 | 7 | 135 | 99.2 | 0.8 | 0 | 95 |
| Cs-139 | 85 | 4 | 132 | 100 | 0 | 0 | 96 |
| Ce-144 | 388 | 5 | 137 | 99.8 | 0.1 | 0.1 | 89 |
| Ce-144 | 351 | 5 | 135 | 98.3 | 1.2 | 0.5 | 88 |
| Zr-95 | 223 | 5 | 133 | 84.5 | 13.2 | 2.3 | 90 |
| $UO_2(NO_3)_2$ | 70 | 7 | 138 | 74.1 | 21.5 | 3.1 | 87 |
| 0.5 N HF Solutions | | | | | | | |
| Cs-137 | 356 | 4 | 138 | 98.5 | 1.5 | 0 | 98 |
| Ce-144 | 469 | 4 | 140 | 2 | 86.7 | 11.3 | 95 |
| Zr-95 | 275 | 5 | 136 | 11.2 | 25.8 | 63 | 102 |
| $UO_2(NO_3)_2$ | 53 | 7.8 | 137 | 10.4 | 88 | 1.6 | 101 |

A comparison of the results obtained in the first six runs of the above Table I where the feed solution was neutral, with those obtained in the last four runs where the feed solution was 0.5 normal in hydrofluoric acid brings out our discovery clearly. It can be seen that when the feed solution is neutral, virtually all the cesium and cerium ions migrate under the influence of the electrodialysis to the cathode compartment, and a large preponderance of the zirconium and uranyl ions. In contrast, when the solution is acidified at the start to one-half normality by an acid such as hydrofluoric acid, only the cesium continues to migrate in a similar manner to the cathode compartment, and the others do so to a far lesser extent. Therefore, cesium ions, and doubtless all other highly electropositive ions, such as those of the alkali metals and the alkaline earth metals, may be separated from cerium, zirconium, and uranyl ions simply by taking the contents of the cathode receiving tank (or the contents of the cathode compartment if the batch type apparatus of FIGURE 1 is used) and subjecting them to a further dialysis; and by repeating this process several times any desired degree of purity may be obtained. In these subsequent dialyses, it is not necessary to keep the acidity refreshed; as the concentration of the impurities diminish, the diminished acidity of the solution is sufficient, for some reason, to permit the dialysis to proceed successfully. The half normal starting acidity of the feed solution appears to be quite critical; at higher acidities the cesium does not migrate completely into the cathode compartment; for example at 2.65 N acid concentration 6.9% of the cesium ions remain in the feed compartment, and 4.1% actually migrate to the anode compartment for some unknown reason. Of course, as already pointed out, at lower acidities there is no separation due to the almost unanimous migration of ions toward the cathode.

Zirconium may be separated due to the large fraction, 63.0% which migrates to the anode compartment. The separation factor is smaller than that in the case of cesium able. The amount of feed solution placed in the feed compartments was 51 ml., and the anode and cathode conductive solutions were both 50 ml. 1 N in $HNO_3$. The surfaces of the two electrodes exposed to the conductive solutions were 3 cm. by 3 cm., or 9 sq. cm.; in the first cycle the current at the start was adjusted to one ampere, which gives a current density of $\frac{1}{9}$ ampere per sq. cm., which is equivalent to 111 milliamperes per sq. cm. As the dialyses proceeded, this value fell due to the increasing resistance of the solutions. The current density in the second cycle was 100 milliamperes per square centimeter. The feed solution for the second cycle was the solution taken from the cathode compartment of the first cycle. The process was carried out at room temperature. The results of this two-cycle separation are shown in Table II.

TABLE II

| Radioisotope | Concn., dps/ml. | Acid Concn. of Feed Cell, M. | | Current Density, Milliamp./ sq. cm. | Fraction of Each Isotope in Each Compartment after 1 Hr. 44 Min., percent | | | Percent Recovered |
|---|---|---|---|---|---|---|---|---|
| | | Initial | Final | | Cathode | Feed | Anode | |
| First Cycle: | | | | | | | | |
| Cs-137 | 403 | 0.557 | 0.0515 | 111 | 99 | 9.2 | 4.9 | |
| Zr-95 | 564 | | | | 1 | 90.8 | 95.1 | |
| Total | 967 | | | | 100 | 100 | 100 | 95 |
| | | | | | Fraction of Each Isotope in Each Compartment after 30 Min., percent | | | |
| | | | | | Cathode | Feed | Anode | |
| Second Cycle: | | | | | | | | |
| Cs-137 | 272 | 0.0515 | 0.0064 | 100 | 100 | 51.8 | 20 | |
| Zr-95 | 20 | | | | 0 | 48.2 | 80 | |
| Total | 392 | | | | 100 | 100 | 100 | 94 | and, therefore, the number of dialyses necessary to achieve a comparable degree of purity is greater. It is true that substantial amounts of zirconium ions remain in the feed compartment and migrate to the cathode compartment, but as a practical matter these can be disregarded since zirconium-95 does not have sufficient economic value to justify an effort to recover it to the extent of one hundred percent. However, if this were desired it could be accomplished by electrodialyzing the feed and cathode compartment fractions.

Cerium and uranyl ions will remain largely in the feed compartment or receiving tank due to the closeness of their respective percentages shown in the table 86.7 and 88.0. As with the other ions they can be substantially freed of all other impurities by repeated electrodialyses. To separate them from each other sufficient sodium bromate is added to oxidize the cerium to the plus four state; the solution is then electrodialyzed and a preponderance of the cerium ions will adhere to the cation exchange membrane due to the strong positive charge of cerium in the plus four state. The cerium ions can be removed from the membrane by repeated washings either in the electrodialysis apparatus or in a separate vessel.

*Example*

To demonstrate the separation of cesium values from zirconium values a solution with a 0.557 molar nitric acid concentration was prepared containing 403 dps/ml. of cesium-137 and 564 dps/ml. of zirconium-95. This was electrodialyzed twice in the batch type apparatus of FIGURE 1, each dialysis being referred to as a cycle. The cation exchange membrane was of the polyacrylic type with sufonic functional groups sold under the trademark Nalco, and the anion exchange membrane was of the polystyrene type with quaternary ammonium functional groups sold under the trademark Permutit Perme- It will be understood that this invention is not to be limited to the details given herein, but that it may be modified within the scope of the appended claims.

What is claimed is:

1. A method of separating cesium, cerium, zirconium, and uranium values from each other in a conductive aqueous solution, comprising acidifying the solution to about 0.5 normal and then subjecting it to electrodialysis through cation and anion exchange membranes and then oxidizing the cerium values in the remaining solution to the plus four state, electrodialyzing the said remaining solution and removing the cerium values from the cation exchange membrane.

2. A method of separating cesium values in a conductive aqueous solution comprising cesium, zirconium, and uranium values, comprising placing the solution in a vessel one wall of which comprises a cation exchange membrane and another wall of which comprises an anion exchange membrane, acidifying the solution to about 0.5 normal, then passing an electric current through the solution from an anode outside the vessel and in electrolytic contact with the anion exchange membrane, to a cathode outside the vessel and in electrolytic contact with the cation exchange membrane and otherwise isolated from the anode, and capturing the cesium ions that pass through the cation exchange membrane.

3. A method of separating cerium and uranium values in a conductive aqueous solution comprising cesium, cerium, uranium, and zirconium values, comprising placing the solution in a vessel, one wall of which comprises an anion exchange membrane and another wall of which comprises a cation exchange membrane, acidifying the solution to about 0.5 normal, then passing an electric current through the solution from an anode outside the vessel and in electrolytic contact with the anion exchange membrane to a cathode outside the vessel and in electrolytic contact with the cation exchange membrane and otherwise isolated from the anode, and capturing the cerium and uranium values remaining in the vessel after the migration through the membranes of the cesium and zirconium values.

4. A method for separating zirconium values in a conductive aqueous solution comprising zirconium, cesium, cerium, and uranium values, comprising placing the solution in a vessel, one wall of which comprises an anion exchange membrane and another wall of which comprises a cation exchange membrane, acidifying the solution to about 0.5 normal, then passing an electric current through the solution from an anode outside the vessel and in electrolytic contact with the anion exchange membrane to a cathode outside the vessel and in electrolytic contact with the cation exchange membrane and otherwise isolated from the anode, and capturing the zirconium values that pass through the anion exchange membrane.

5. A method of separating cerium values from uranyl values in a conductive aqueous solution, comprising placing the solution in a vessel one wall of which comprises an anion exchange membrane and another wall of which comprises a cation exchange membrane, acidifying the solution to about 0.5 normal, adding sufficient sodium bromate to oxidize the cerium values to the plus four state, then passing an electric current through the solution from an anode outside the vessel and in electrolytic contact with the anion exchange membrane to a cathode outside the vessel and in electrolytic contact with the cation exchange membrane and otherwise isolated from the anode, capturing the uranyl values that remain in the vessel, and removing the cerium values that adhere in the cation exchange membrane.

References Cited in the file of this patent

UNITED STATES PATENTS

| 2,251,083 | Theorell | July 29, 1941 |
| 2,723,229 | Bodamer | Nov. 8, 1955 |

FOREIGN PATENTS

| 1,178,760 | France | Dec. 15, 1958 |

OTHER REFERENCES

Kressman: Nature, vol. 165, April 8, 1950.
Sato et al.: Analytical Chemistry, vol. 26, 1954, pages 267–271.